(12) United States Patent  
Brumfield

(10) Patent No.: US 6,601,335 B1  
(45) Date of Patent: Aug. 5, 2003

(54) FISHING LINE RETENTION DEVICE

(76) Inventor: Jerry L. Brumfield, 39 Lyons La., Coatsville, PA (US) 19320

( * ) Notice: Subject to any disclaimer, the term of this patent is extended or adjusted under 35 U.S.C. 154(b) by 0 days.

(21) Appl. No.: 10/251,992

(22) Filed: Sep. 20, 2002

(51) Int. Cl.$^7$ ............................................... A61K 87/00
(52) U.S. Cl. ......................... 43/25.2; 242/322; 242/580
(58) Field of Search ..................... 43/25, 25.2, 57.1; 242/322, 323, 580, 583

(56) References Cited

U.S. PATENT DOCUMENTS

| | | | |
|---|---|---|---|
| 479,218 A | * | 7/1892 | Koppenhofer ............. 24/712.5 |
| 484,661 A | * | 10/1892 | King .......................... 24/712.5 |
| 2,791,054 A | | 5/1957 | Gronek |
| 2,849,825 A | * | 9/1958 | Reisner ....................... 43/25.2 |
| 2,932,118 A | * | 4/1960 | Jend ............................ 43/57.1 |
| 3,086,312 A | * | 4/1963 | Davis .......................... 43/25.2 |
| 3,164,334 A | | 1/1965 | Gris |
| 3,199,243 A | | 8/1965 | Caston |
| 3,940,873 A | * | 3/1976 | Lawless ...................... 43/57.1 |
| 4,203,245 A | * | 5/1980 | Peterson ..................... 43/25.2 |
| 4,457,095 A | | 7/1984 | Stevenson |
| 4,498,615 A | * | 2/1985 | Johnson ...................... 224/274 |
| 4,528,772 A | * | 7/1985 | Schaefers ................... 43/54.1 |
| 4,648,197 A | | 3/1987 | Weiberg, Jr. |
| 4,883,238 A | | 11/1989 | Harder |
| 4,924,621 A | | 5/1990 | Hawranik et al. |
| 5,020,264 A | | 6/1991 | Demski |
| 5,131,180 A | | 7/1992 | Ives |
| 5,214,874 A | | 6/1993 | Faulkner |
| 5,263,276 A | | 11/1993 | Washington |
| 5,277,306 A | * | 1/1994 | Sargent .................... 206/315.1 |
| 5,318,019 A | * | 6/1994 | Celaya .................. 128/204.26 |
| 5,333,813 A | * | 8/1994 | Hirano ........................ 242/322 |
| 5,454,185 A | * | 10/1995 | Love ........................... 43/57.1 |
| 5,595,014 A | | 1/1997 | Moore |
| 5,598,658 A | | 2/1997 | Walker |
| 5,617,668 A | * | 4/1997 | Shimandle .................. 43/44.8 |
| 5,870,849 A | | 2/1999 | Colson, Jr. |
| 6,021,550 A | | 2/2000 | Welch |
| 6,408,563 B1 | | 6/2002 | Van Scoy |
| 6,483,033 B1 | * | 11/2002 | Simoes et al. ............. 174/72 A |
| 6,516,555 B2 | * | 2/2003 | Buzzell ...................... 43/57.1 |
| 2001/0029646 A1 | | 10/2001 | Wirtschfter |
| 2002/0194769 A1 | * | 12/2002 | Wicker et al. .............. 43/25.2 |

* cited by examiner

*Primary Examiner*—Charles T. Jordan  
*Assistant Examiner*—Jordan M. Lofdahl  
(74) *Attorney, Agent, or Firm*—RatnerPrestia

(57) ABSTRACT

A fishing line retention device for use on a piece of fishing equipment is provided. The fishing line retention device comprises a hook member having a plurality of hooks on one side, a loop member having a plurality of loops on one side, and a mounting adhesive disposed on the hook member or the loop member. The loops cooperate with the hooks to removably attach the hook member to the loop member. The invention optionally includes visual indicia on either the loop or hook member to aid the angler with identification of a physical quality of the line retained in the device. Also included is a fishing line retention system kit consistent with the above system, and a fishing reel having a line retention device consistent with the above system.

8 Claims, 16 Drawing Sheets

FISHING LINE RETENTION DEVICE

BACKGROUND OF THE INVENTION

Many types of fishing tackle exist for different fishing conditions. Also determinative of the type of tackle used is the preference of the angler. Two main types of rods exist, namely fly rods and conventional rods. Four main types of reels exist, namely fly reels, spinning reels, spin-casting reels, and bait-casting reels. Fly reels are used with fly rods and the later three types are normally paired with conventional rods.

In conventional fishing (hereinafter used to refer to all types of rod and reel fishing which is not fly-fishing), a line is used to connect the bait or lure to the reel. The bait or lure is cast by whipping the rod in a forward direction, thereby transferring energy to the bait or lure. The bait or lure then flies out over the water, carrying the line with it. In this situation, the bait or lure is the object to which energy is imparted through the rod and the line is passively carried out behind the bait or lure. Sometimes, a weight, typically lead, is added to increase the distance that the bait or lure can travel.

The physics of fly fishing, however, is quite different. In fly fishing, the "lure" which is offered to trigger a fish to strike is referred to as a "fly" and is typically comprised of a relatively small metal hook to which appropriately colored feathers are attached, typically with appropriately colored thread. The traditions behind fly fishing are historically deep rooted and the art arose when anglers emulated hatching aquatic insects (i.e., flies) in order to hook a fish.

Nowadays, however, thousands of materials exist for tying flies and many "flies" actually emulate swimming minnows or small baitfish. One aspect has remained relatively constant, however, and that is in regard to the weight (mass) of the fly. The fly is extremely light in weight and can not be cast with conventional tackle, because of this light weight. Adding weight, such as a lead sinker, is not an option as typically the fly is floated atop the water surface to simulate the hatching fly. Other factors prevent the use of weight, such as needing to "dead drift" the presentation in the natural stream currents, a challenging factor associated with fly fishing of which those skilled in the art are well aware.

In order to cast a fly having such little weight, fly fishing was developed. This type of fishing is different in that the terminal tackle (fly) is not the object of energy transfer from the rod, as is the lure discussed above in conventional casting. Rather, in fly casting, the fly line is the object of energy transfer from the fly rod and the line (as opposed to the terminal tackle) is what is cast. The fly is simply carried out with the line. In order to achieve this, fly lines have evolved into specially tapered lines, with mass and radial gradients along their lengths. The lines, generally, are relatively thick and have a great deal more mass per linear foot than a conventional fishing line, such as a conventional monofilament line.

Some fly lines have hollow inner cores to promote floating of the line as it lays on the water. Other lines have lead cores to promote sinking in the water, where it is the desire of the angler to sink his fly presentation, such as when a nymph, minnow, or other subsurface organism is emulated by the fly pattern used. These lines, therefore, are quite different from conventional fly lines.

Because of the thickness of these fly lines, the angler cannot simply tie a fly to the end of the fly line. The sight of such a large line connected to a light fly would spook a fish and discourage it from eating the fly. Thus, a leader, typically a monofilament similar to a conventional monofilament line, is attached to the end of the fly line. A typical leader length is 4 to 12 feet, sometimes approaching 16 feet depending upon the fishing conditions and species sought. The leader may have a constant diameter along its length, or may be tapered to aid in better presentation of the fly. Sometimes, the leader is knotless, which is a tapered leader having a decreasing diameter from its proximate end to its distal end (the proximate end being the end which is attached to the fly line). In order to achieve the same tapered affect without a knotless leader, anglers sometimes tie a series of monofilaments together, each progressive piece having a smaller diameter than its predecessor as one moves from the proximate end to the distal end. In any event, the distal end of a tapered leader has a smaller diameter than any other part of the leader.

To the distal end of the leader is attached either a tippet or a fly. Sometimes, a fly angler expects to change flies many times over the course of the day of fishing, for a variety of reasons. Sometimes, as the day progresses and temperatures rise, fishing activity on the surface diminishes. Sometimes, the rising sun puts fish down, or causes a decrease in aquatic insect hatching, which generally occurs at low light conditions. Sometimes, the angler experiments with different fly patterns to find the one that works best. All of these reasons, as well as many others (e.g., a fly being torn apart after repeatedly being bit by a fish) lead the angler to tie on and cut off a number of flies during the day. This means that each time a change is made, the leader gets shorter. In order to allow a series of flies to be attached to the leader over time without each fly being tied to a thicker piece of monofilament as one progresses up the leader, a tippet is often used.

A tippet is a thin piece of material which is tied to the end of the leader and has a constant diameter. Many flies can be tied on and cut off throughout the course of fishing without having to worry about the physical characteristics of the leader changing. Thus, a typical fly fishing line system is comprised of a fly line, a leader, and a tippet, in that order, as one moves along the system toward the distal end. Oftentimes, a backing line is also in place proximate the fly line, but a discussion of the backing line is not necessary for an understanding of the invention.

As discussed above, fishermen, especially fly fishermen, will often change their lure, bait, or fly repeatedly while out on the water and between bouts of fishing. Often, an angler will cut off a lure, bait, or fly and move to another spot and try a different lure, bait, or fly. During this move or change, the loose end of the fishing line often becomes tangled, becomes subject to abrasion (and thus weakening), or is lost in the reel as it is pulled into the spool with the spooled up line. This last aspect is especially problematic with spin casting reels and fly reels, but it is a problem present with all types of tackle.

Spin casting reels have their spools enclosed with a cover, such as that shown in FIG. 1. If the end of the fishing line 100 is accidentally reeled past opening 110 of cover 120 and into the enclosed spool, the angler must open the reel and retrieve the distal end, rethread it through the opening, and replace the cover. This is especially problematic if it is windy or the angler is standing in moving water, such as a creek or river.

Fly fishing reels also present specific challenges in that, as discussed above, the fly line is particularly thick as compared to the monofilament leader or tippet. FIG. 2a shows a fly reel 200 with the line components discussed above. Extending from reel 200 is fly line 210, to which is attached leader 220, to which is attached tippet 230 at knot 235. Distal end 240 is also shown in FIG. 2A. FIG. 2b is the bottom view of fly reel 200, with the fly line, leader, and tippet reeled all the way in to the spool. As is seen, the leader and tippet are easily lost within the large diameter fly line. This makes regaining tactile possession of the tippet very difficult, especially with wet or cold hands, as fly fishermen often have.

Furthermore, and as noted above, different fly lines are used for different conditions. An angler might start off the day with a floating line for fishing a dry fly. Later in the morning when a hatch is over, he might switch to a sinking tip line or sinking line for use with under-water flies such as nymphs or streamers. Then later in the day when the sun is lower and a dusk hatch begins, the angler might want to switch back to the floating line spool or reel to fish dry flies again. Because of this need for flexibility, an angler, particularly a fly fisherman, will carry several different reels (or at least several different spools of lines which can be substituted into and out of the same reel) for use throughout the day.

Some devices have been developed to help meet the challenges and problems discussed above in regard to losing the end of a fishing line. U.S. Pat. Nos. 4,457,095 and 4,883,238, as well as U.S. Patent Application Publication 2001/0029646 A1, all disclose devices which rely on physically pinching the line into a groove to prevent loss of the fishing line. This frictional anchoring, however, can lead to abrasion of a sensitive leader, line, or tippet monofilament.

U.S. Pat. No. 6,408,563 discloses a hooking device which must first be secured to a fishing rod and requires a loop to be tied in the end of the fishing line which is secured around the hook. This device requires additional shortening of the fishing line every time it is used because a loop must be tied into the distal end of the line. It also requires additional time to be spent by the angler in that a loop must be tied. It also requires that the rod and reel be together whenever it is utilized.

To solve these and other problems, a fishing line retention device that allows easy anchoring of the tippet or distal end of a fishing line, without causing damage to the line and without modifying the angler's tackle, would be desirable. Such a device which also works even when the reel is removed from the fishing rod would be particularly desirable.

SUMMARY OF THE INVENTION

The present invention includes a fishing line retention device for use on a piece of fishing equipment. A preferred embodiment includes a device comprising a hook member having a plurality of hooks on one side and a loop member having a plurality of loops on one side. Included is a mounting adhesive disposed on either the hook member or the loop member, on a side opposite the hooks or loops. The loops cooperate with the hooks to removably attach the hook member to the loop member. The adhesive has sufficient adhesion to allow use of the device on a fishing reel to retain a fishing line.

Also included as a part of the invention is a fishing line retention device kit comprising a hook member having a plurality of hooks on one side, a loop member having a plurality of loops on one side, a mounting adhesive disposed on either the hook member or the loop member on a side opposite the hooks or loops, and a peel-away protective backing layer disposed on the mounting adhesive. The loops cooperate with the hooks to removably attach the hook member to the loop member. The mounting adhesive is preferably water-resistant and has sufficient adhesion to allow use of the device on a fishing reel.

Another embodiment of the kit of the present invention comprises a hook member having a plurality of hooks on one side, a loop member having a plurality of loops on one side, an adhesive layer disposed on each of the hook member and loop member, on a side opposite the hooks and loops, respectively. A peel-away protective backing layer is disposed on both adhesive layers. Also included is a visual indicia member indicating a physical quality of the fishing line to be retained in device.

The present invention also includes a fishing reel comprising a body, a spool attached to the body for holding line, a hook member having a first side attached to either the body or the spool, and a second side having a plurality of hooks. Included is a loop member having a plurality of loops which cooperate with the hooks to removably attach the loop member to the hook member.

DETAILED DESCRIPTION OF THE INVENTION

Figure 1:
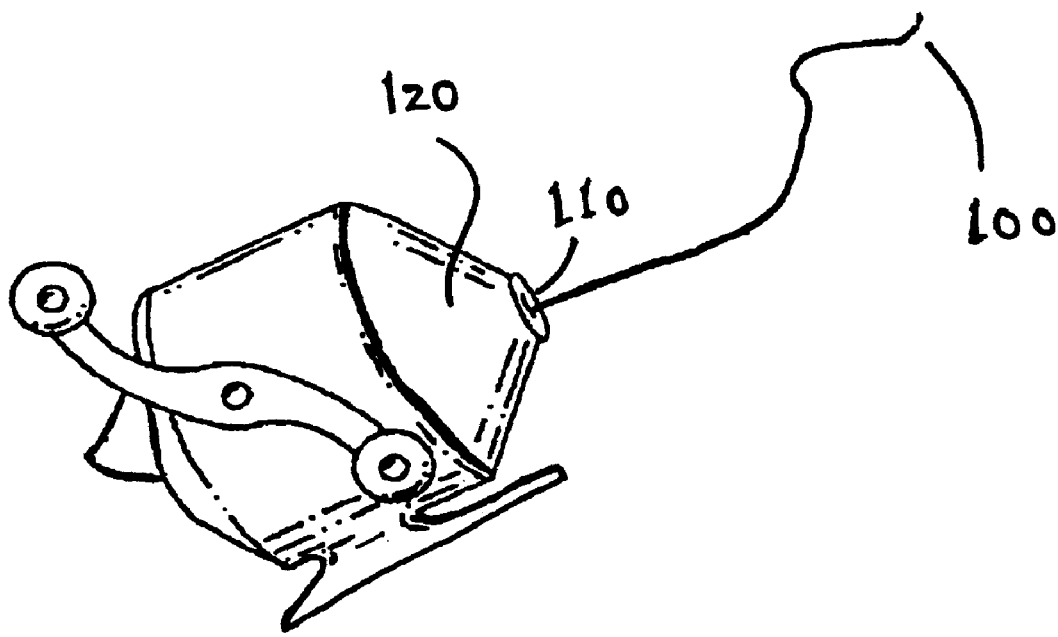
FIG. 1 is a perspective view of a spin casting reel and loose fishing line in accordance with the prior art.
Figure 2A:
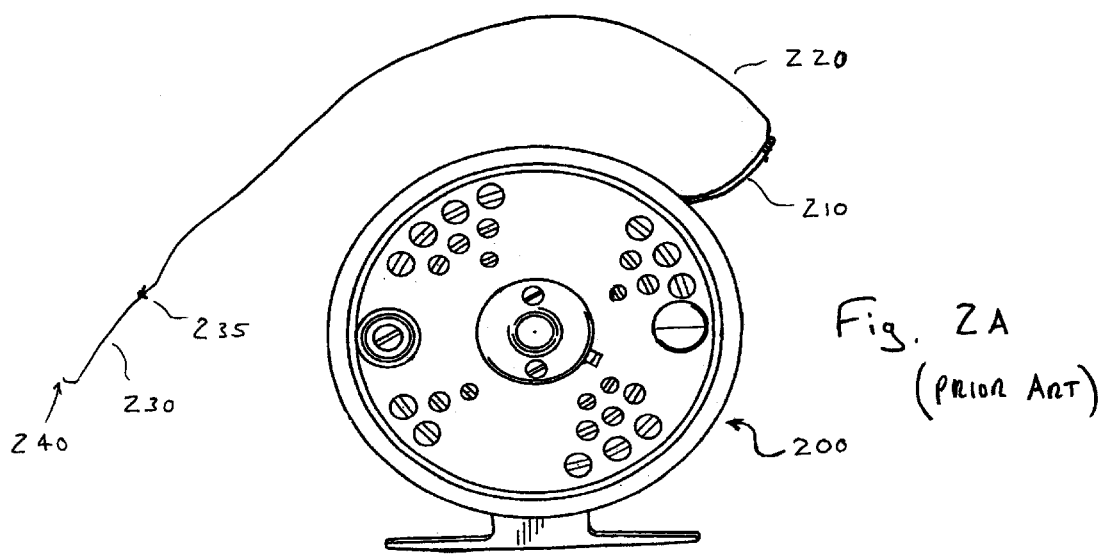
FIG. 2A is a side view of a fly reel with a loose fly line, leader, and tippet, in accordance with the prior art.
Figure 2B:
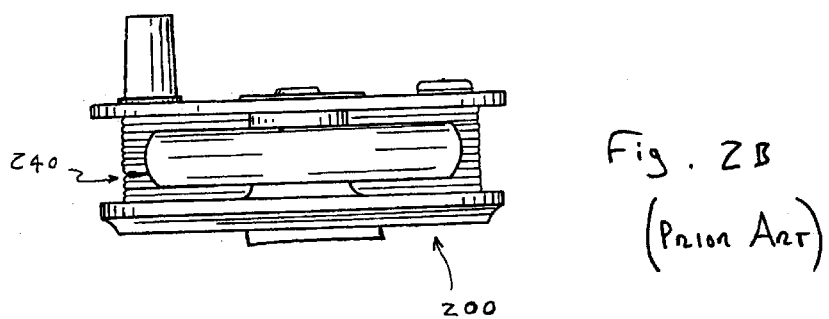
FIG. 2B is bottom view of that shown in FIG. 2A with the line wound all of the way onto the spool, in accordance with the prior art.
Figure 3:
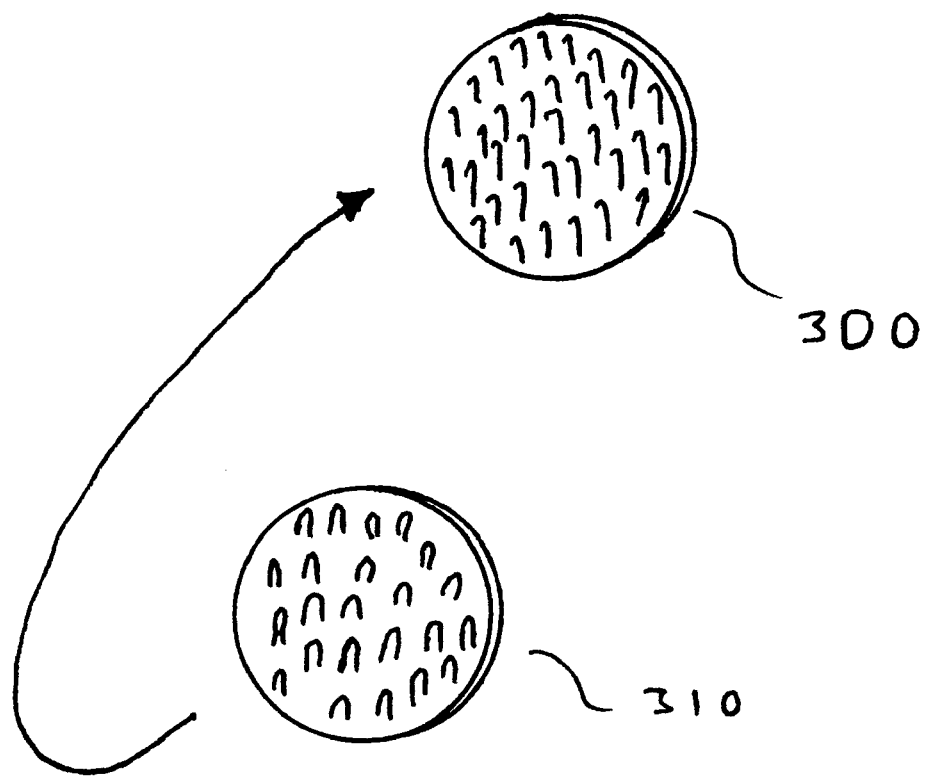
FIG. 3 is an exploded perspective view of one embodiment of the present invention.

The present invention is a fishing line retention system for use on a piece of fishing equipment. The system generally comprises a first and second piece of cooperating hook and loop material, such as that sold under the trademark, VELCRO® (VELCRO is a registered trademark of Velcro Industries for a hook and loop fastening system) whereby the first piece cooperates with the second piece to removably attach the first and second pieces. FIG. 3 illustrates an example of such a cooperating pair of hook and loop material cut to form two circular pieces. Hook member 300 and loop member 310 would be placed face to face with each other and pressed together to removably attach them to each other. To pull them apart, the user simply pulls the two pieces apart.

Figure 4:
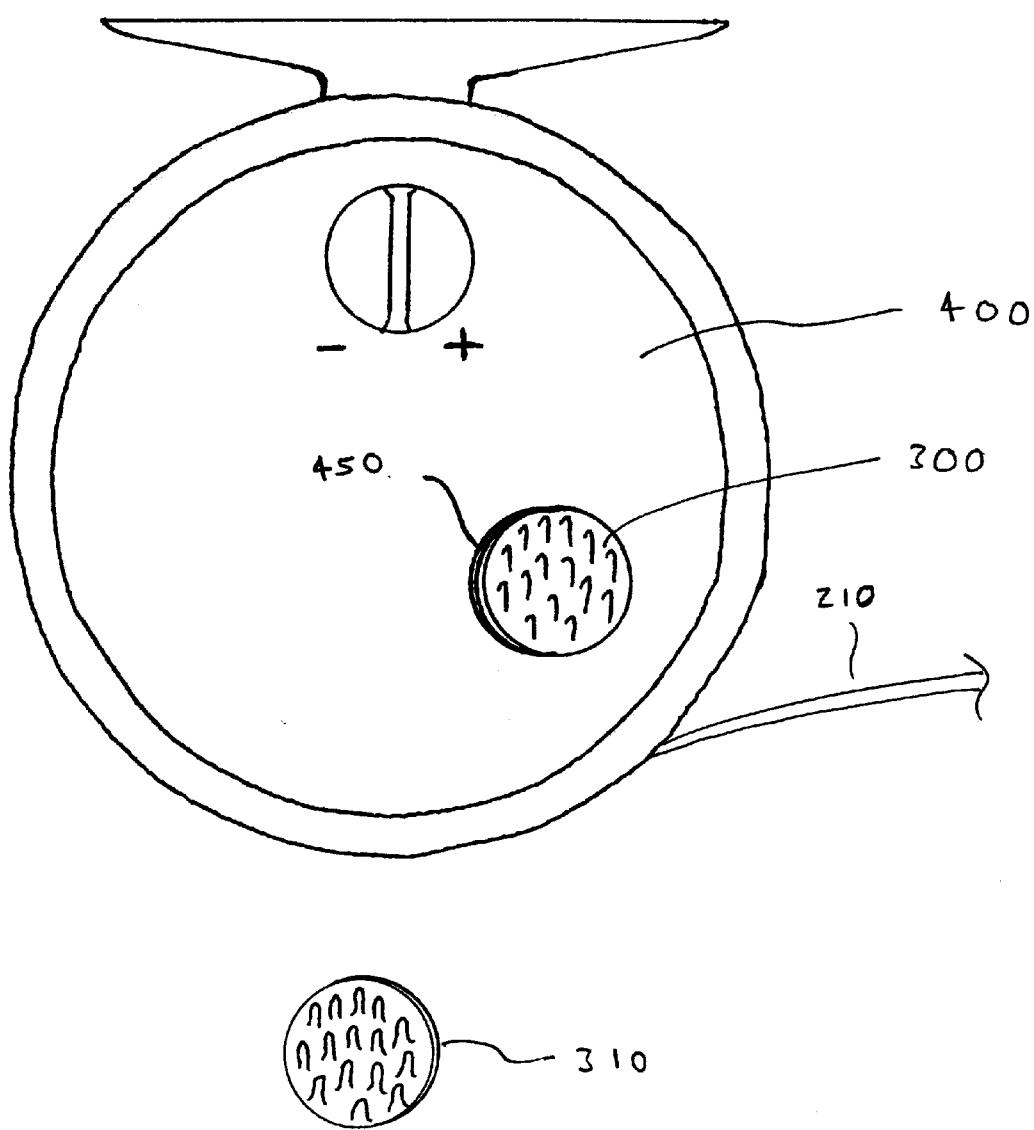
FIG. 4 is a side view of the device of FIG. 3 as used on a fly reel.

FIG. 4 shows hook member 300 disposed on a piece of fishing equipment. In this exemplary embodiment, hook member 300 is attached to fly fishing reel 400 via an adhesive layer 450. Any suitable adhesive would work, but a preferred adhesive is one which is particularly water-resistant. A water-soluble adhesive will shorten the effective life of the device as fishing equipment often gets wet. A preferred adhesive, therefore, is one which will not lose its adhesive properties when exposed to water. FIG. 4 also shows fly line 210 extending from fly reel 400. Loop piece 310 is shown unattached to the device.

Figure 5:
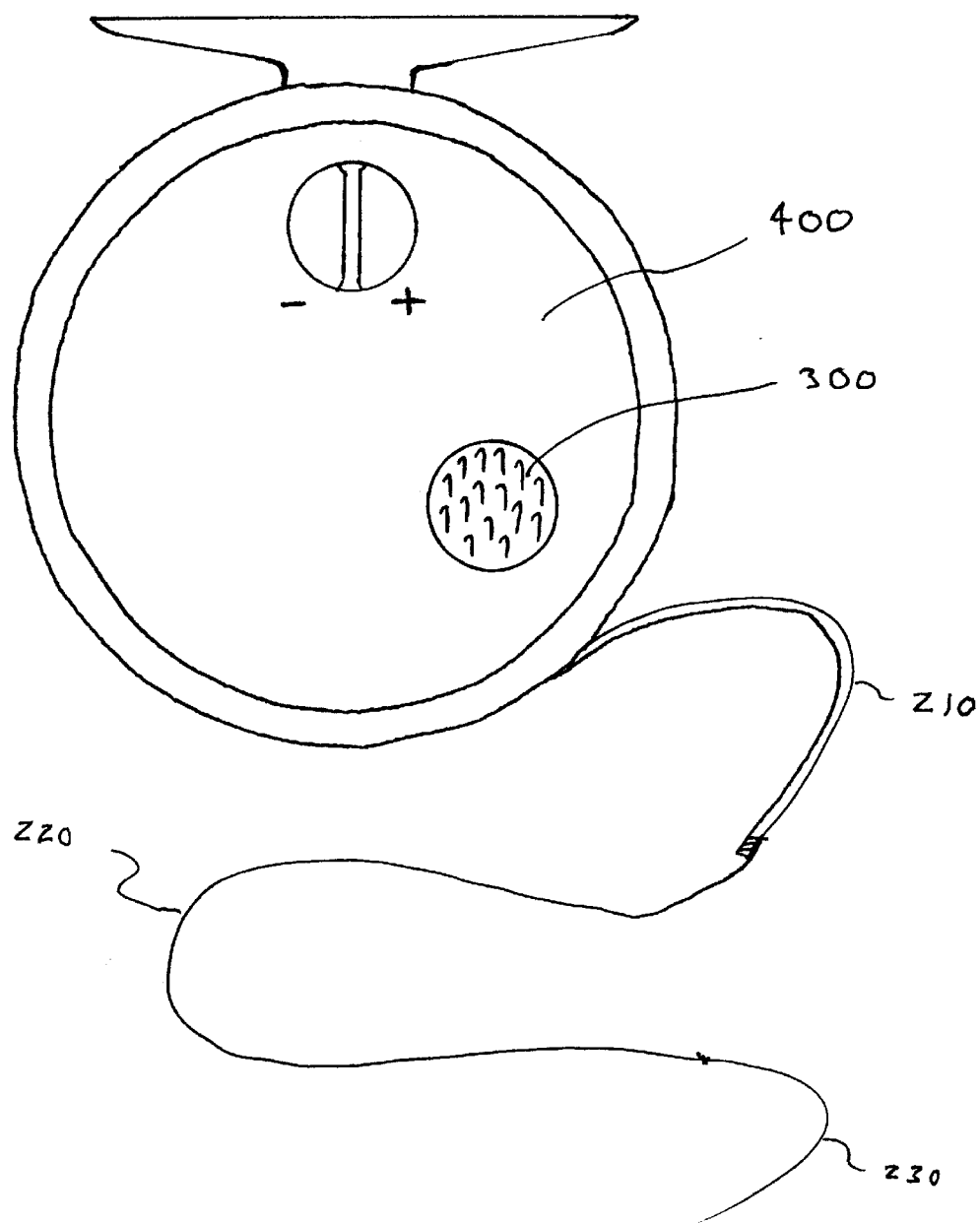
FIG. 5 shows a hook member disposed on a fly reel with fly line, leader, and tippet loosely hanging from the fly reel.

When the angler is ready to reel up his line, such as when he is done fishing, or is ready to move to a different spot, or when he is ready to change reels so as to be able to fish with a different line, he removes his fly and reels his line in to what is shown in FIG. 5. FIG. 5 shows fly line 210, leader 220, and tippet 230 reeled nearly all of the way onto reel 400.

Figure 6:
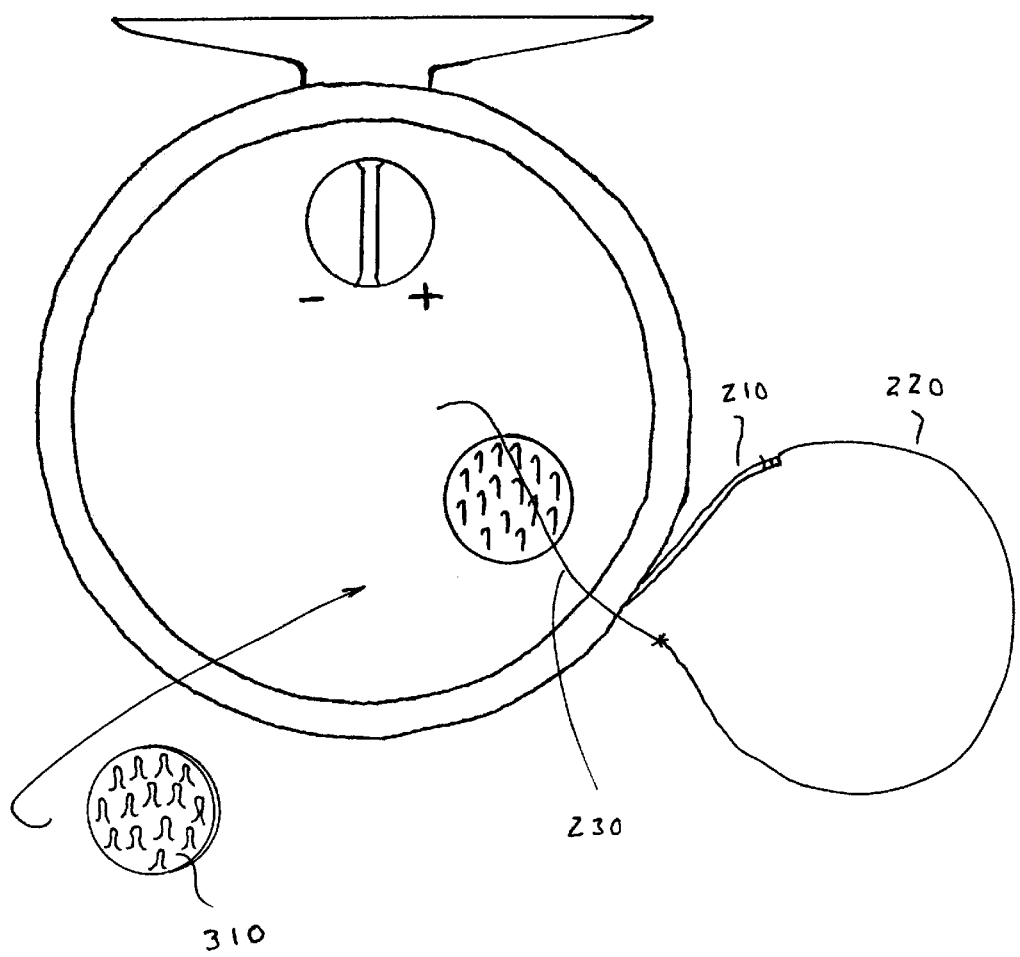
FIG. 6 shows a tippet laid across a hook member ready to be retained with a loop member in accordance with the present invention.
Figure 7:
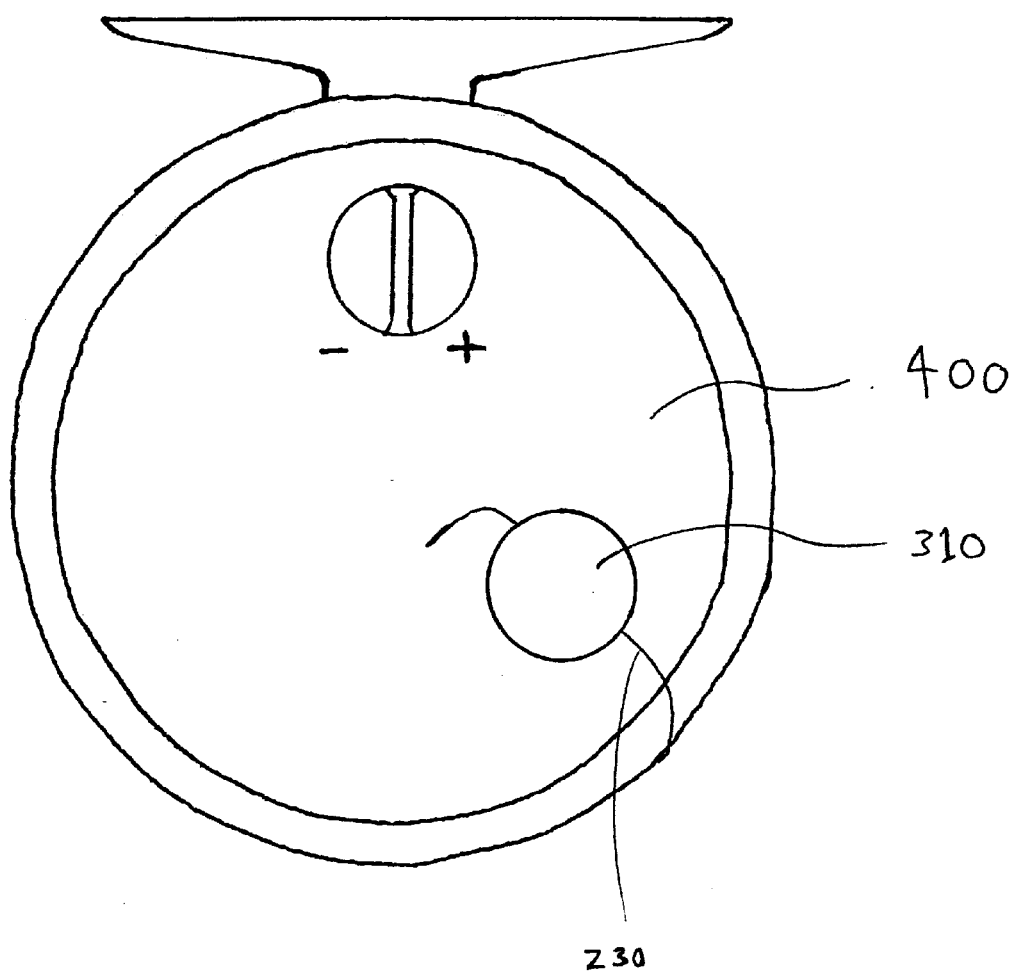
FIG. 7 shows the device of the present invention in place on a fly reel holding a fishing line securely in place.

FIG. 6 shows tippet 230 laid over hook member 300, with loop member 310 ready to be attached thereto. FIG. 7 shows loop member 310 attached to hook member 300 with tippet 230 held securely in place. The slack line has been reeled onto reel 400. The reel is now ready to be removed from the rod (not shown) or stored away without fear of losing the tippet within the spooled line or damaging the tippet during storage. This technique does not damage or fray the sensitive tippet material, nor does it require tying any special knot in the end of the tippet which would unnecessarily waste tippet material.

It is noted that it is not critical which piece of material (i.e. the hook member or loop member) is applied to the fishing tackle. It is preferred, however, that the hook member is applied to the fishing tackle, such as a reel, as this allows the loop member, which is generally softer to the touch, to be pulled off of the hook member which remains attached to the fishing tackle.

Figure 8:
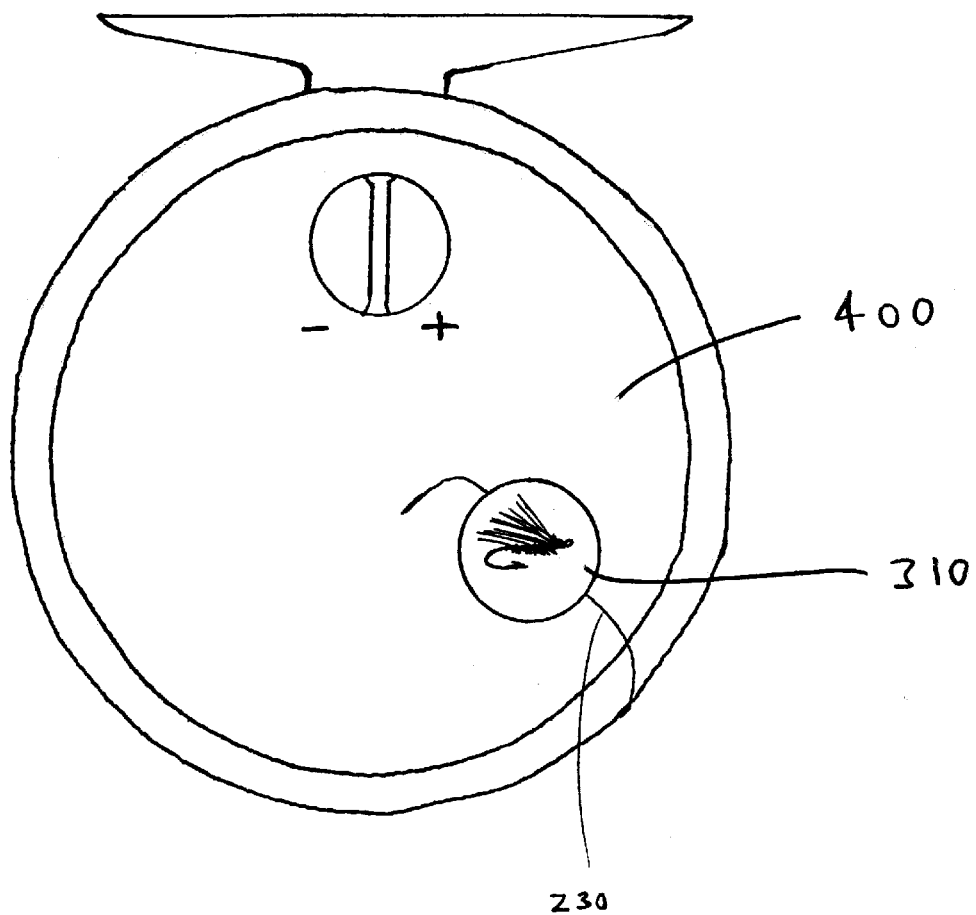
FIG. 8 shows the device of FIG. 7 with visual indicia disposed thereon.

An additional embodiment of the present invention includes visual indicia on the half of the cooperating hook and loop material not attached to a piece of fishing equipment. The visual indicia is used to aid the angler in identifying physical qualities of the fishing line retained therein. FIG. 8 shows such an embodiment, where visual indicia is disposed on the side of loop member 310 not having the loops. In this case, the visual indicia is a picture of a dry fly. This visual indicia can aid an experienced angler in that the image can carry with it specific meaning to the angler. For example, a dry fly image would tell the angler that he has a dry fly fishing leader and tippet system attached to his fly line. A wet fly image would tell him that he has a wet fly tippet and leader system attached to his fly line.

Figure 9:
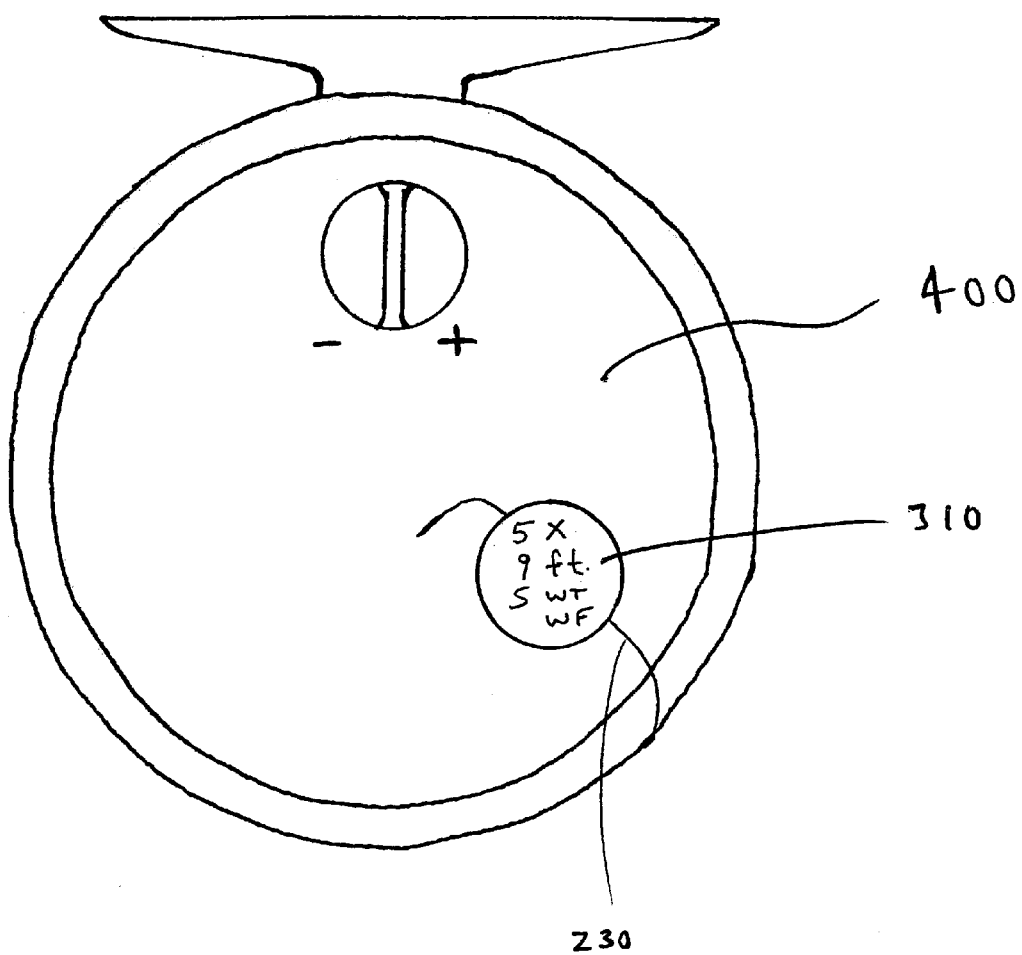
FIG. 9 shows an alternative embodiment of the device shown in FIG. 8.

FIG. 9 shows an additional embodiment of the invention with yet another use of specific visual indicia in that particular information about the fishing line (or entire rig) is visually supplied to the user. In the exemplary embodiment shown in FIG. 9, the information indicated is that the tippet is 5X weight, the leader is 9 feet long, and the fly line is a 5 weight, weight forward line. This type of information is well-understood by those skilled in the art, and is important to the angler using the particular set up. When an angler reels in and puts his tackle away for several weeks, he might easily forget what is on a particular reel. It is also common for a fly-angler to have several reels or spools with him during the course of a day. Switching between reels while fishing can become confusing if the different systems are not properly labeled.

Figure 10:
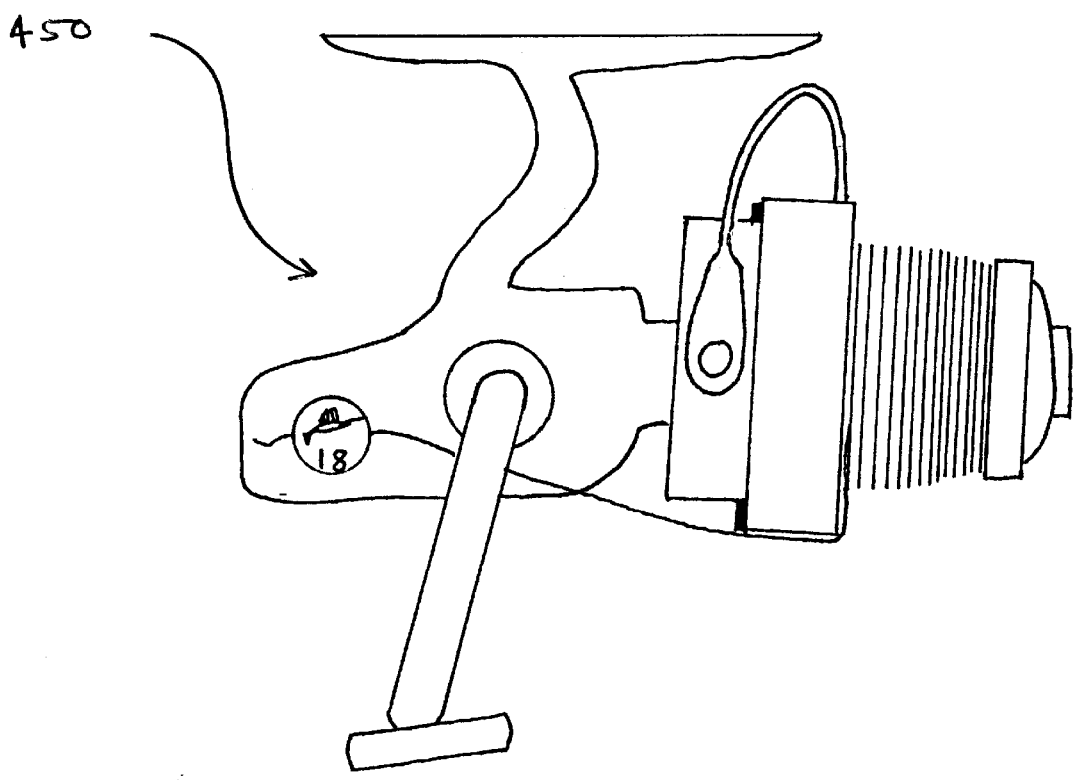
FIG. 10 shows the use of the device of the present invention on a spinning reel.

Another example of the type of visual indicia for conventional reels would include a salt-water fish, such as a sailfish, on a salt water line, and a fresh water fish, such as a rainbow trout, on a fresh water line. Conventional monofilaments are often developed for use in either salt or fresh water. For example, FIG. 10 shows the present invention used on a spinning reel 450 to indicate that the reel contains 18 pound test, salt water line. Thus, an angler who pulls his equipment out of the closet after not using it for an extended period of time would be effectively aided in determining which lines were on which reels by using the present invention.

Figure 11:
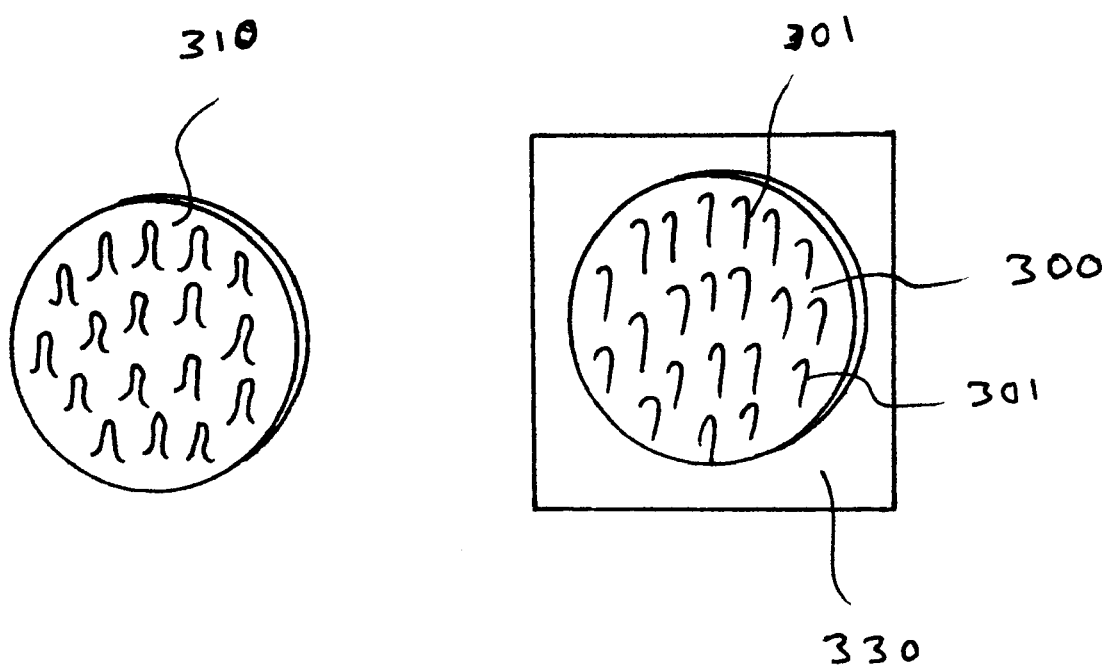
FIG. 11 shows a kit in accordance with the present invention.

FIG. 11 shows the simplest form of a kit according to the present invention, including two pieces of cooperating hook and loop material, hook member 300 and loop member 310. Hook member 300 has an adhesive layer disposed on the side opposite the hooks 301, which is protected by a removable, peel-away protective backing layer 330. When the angler is ready to apply hook member 300, the angler merely pulls the backing layer away, exposing the adhesive. Hook member 300 can then be pressed into place on the desired piece of fishing tackle as described above.

Figure 12:
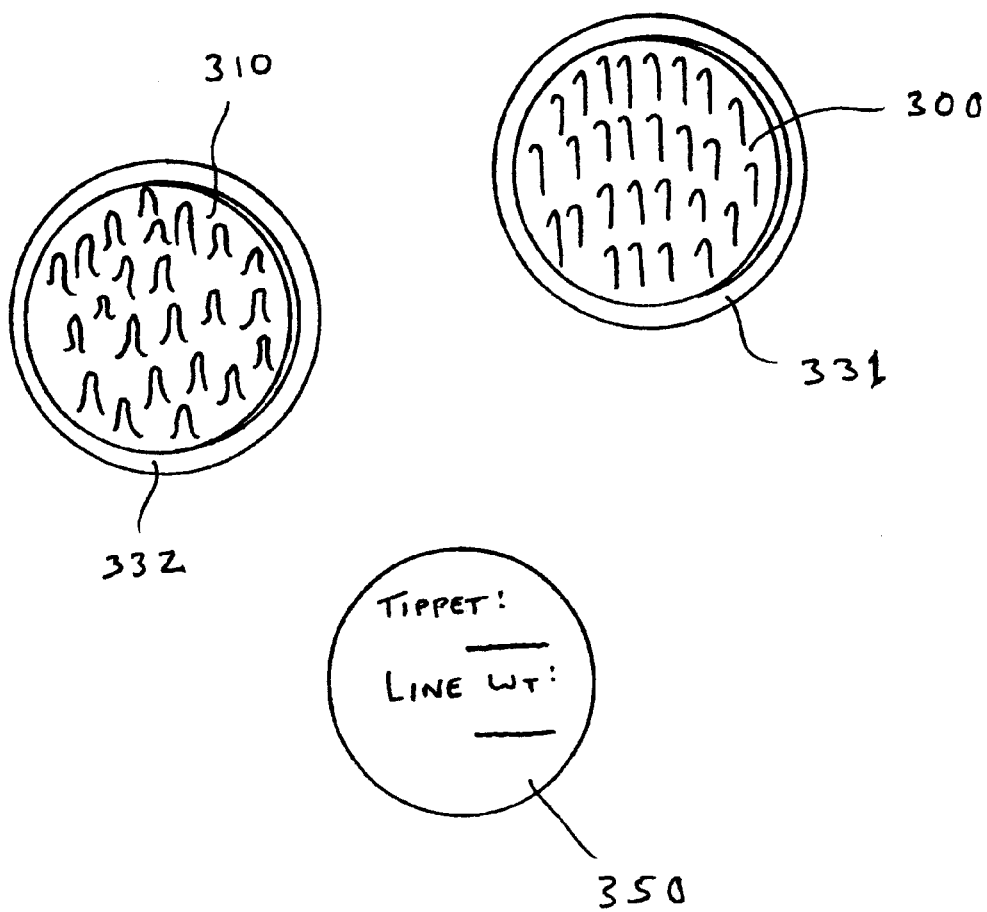
FIG. 12 shows an alternative embodiment of the kit shown in FIG. 11 including a substrate containing visual indicia to aid the angler with identification of a fishing line in accordance with the present invention.

FIG. 12 shows an additional embodiment of the kit discussed above, further including a visual indicia substrate 340. Included in this embodiment is a kit comprised of two cooperating pieces of hook and loop material, an adhesive disposed on each piece on the side opposite the hooks and loops, respectively, and a substrate having suitable visual indicia. More specifically, FIG. 12 shows round piece of peel-away protective layers 331 and 332 on hook member 300 and loop member 310, respectively. The shape of the peel-away backing is not important, so long as it completely covers the adhesive on each piece of material. Also included in this kit is substrate 350 which has suitable visual indicia. In this example, substrate 350 contains blanks for the angler to write the tippet size he is using and the line weight he is using. As described above, however, any number of suitable visual indicia can be supplied on substrate 350 which will offer the angler important information about the rig or line he is retaining using the device of the present invention.

The visual indicia substrate can take any of a number of forms. Preferably, the visual indicia substrate is paper, cardboard, wood, metal, plastic (preferably PVC), or any other suitable material. If printing is to be done ahead of time, or if the substrate is to be used by the angler to write information about the rig, the ink/substrate interaction should be taken into account when selecting the material for the substrate (i.e., the substrate should not be unwriteable or unprintable). Other possibilities for the substrate include a laminated combination, such as a paper printed with the desired visual indicia and laminated within plastic, or a paper sheet laminated to a wood disk, for example. Another possible visual indicia substrate would be a molded metal disk with an embossed image of a fish or fly. Any of the above visual indicia substrates would be provided to be attached (preferably adhered with a water-resistant adhesive) to the side of the hook or loop member not having hooks or loops, as described more fully herein.

The components of the kit shown in FIG. 12 are easily applied by the angler by first adhering hook member 300 to a suitable location, such as a fishing reel, after removing peel-away protective layer 331. Then, peel-away protective layer 332 is removed from loop member 310, and substrate 350 is adhered thereto. The system is now ready to be labeled appropriately and used to retain a fishing line as described above.

The present invention also includes a fishing reel comprising a body, a spool attached to the body for holding line, and either a hook member or a loop member having a first side attached to the reel body. The hook or loop member may alternatively be attached to the spool (instead of the body), which is sometimes removable from the reel body, especially in the case of spinning reels and fly reels. Included with the reel in this embodiment is a cooperating member of loop or hook material to cooperatively connect with the attached member to retain a fishing line therebetween.

Figure 13:
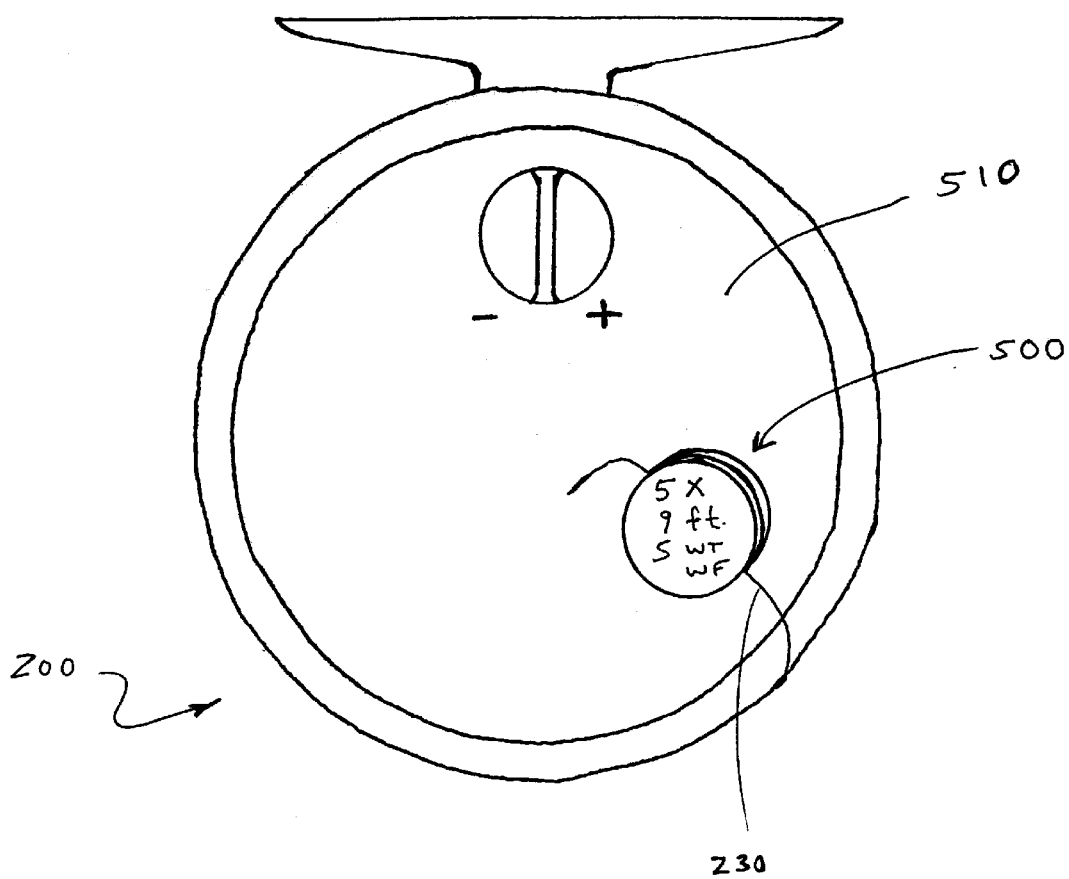
FIG. 13 illustrates a fly reel having a device according to the present invention attached to the reel body.
Figure 14:
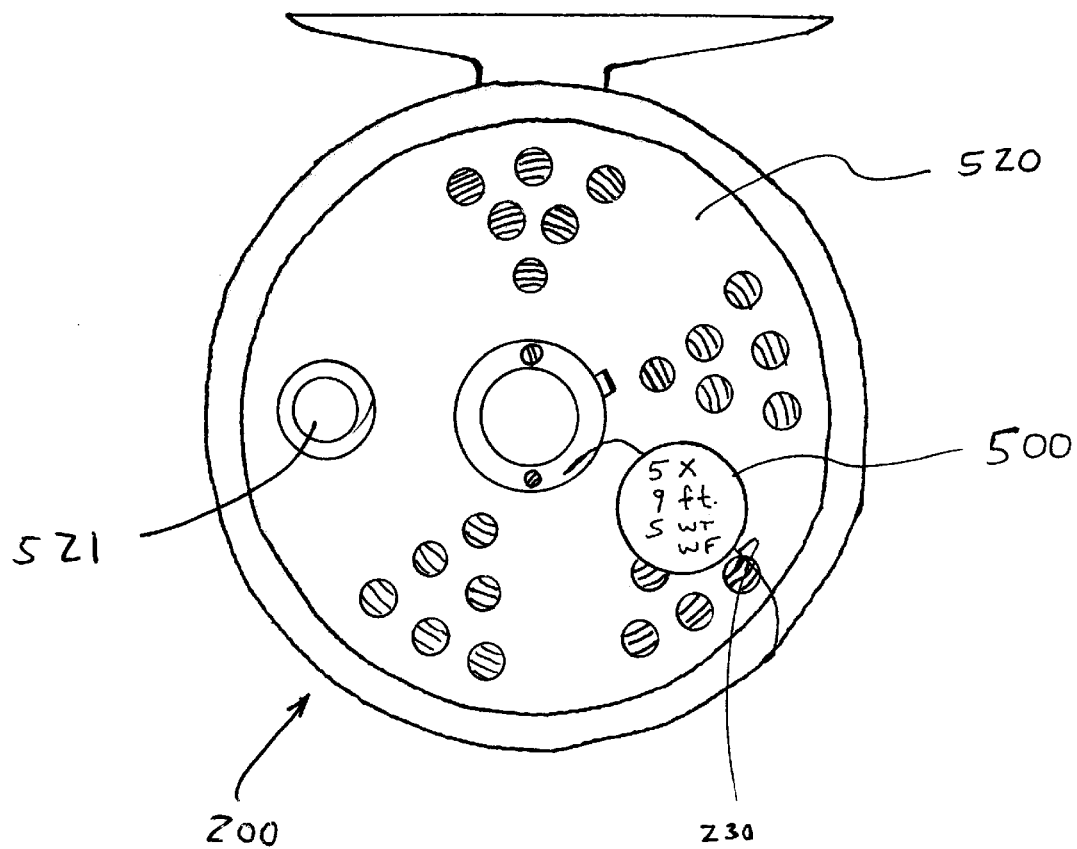
FIG. 14 illustrates a fly reel having a device according to the present invention attached to the reel spool.

FIG. 13 shows such an example, where fly reel 200 is shown with retention device 500 shown attached and holding tippet 230 in place. In FIG. 13, retention device 500 is adhered to fly reel body 510. FIG. 14 shows fly reel 200 from the other side, which illustrates the attachment of retention device 500 to fly reel spool 520. Crank handle 521 is mounted to fly reel spool 520 to allow rotation of fly reel spool 520 within fly reel body 510. Thus, the adhesion of retention device 500 in accordance with the description above can occur on either the body or spool of a fly reel.

Figure 15:
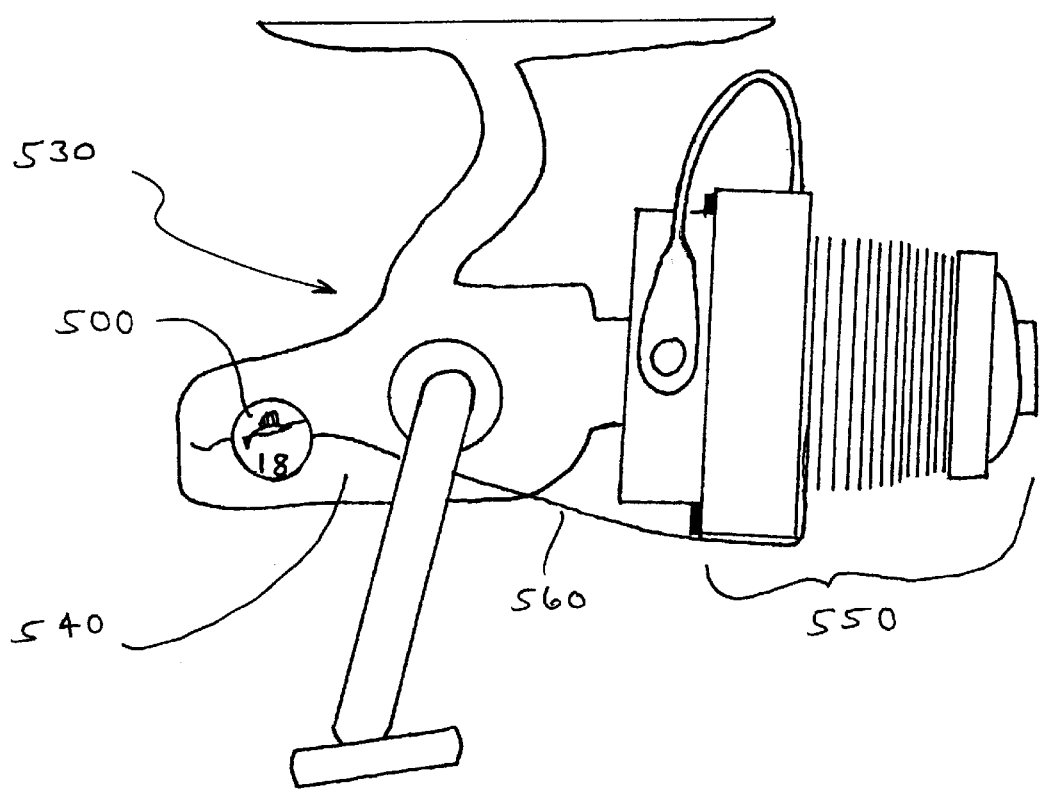
FIG. 15 illustrates a spinning reel having a device according to the present invention attached to the reel body.
Figure 16:
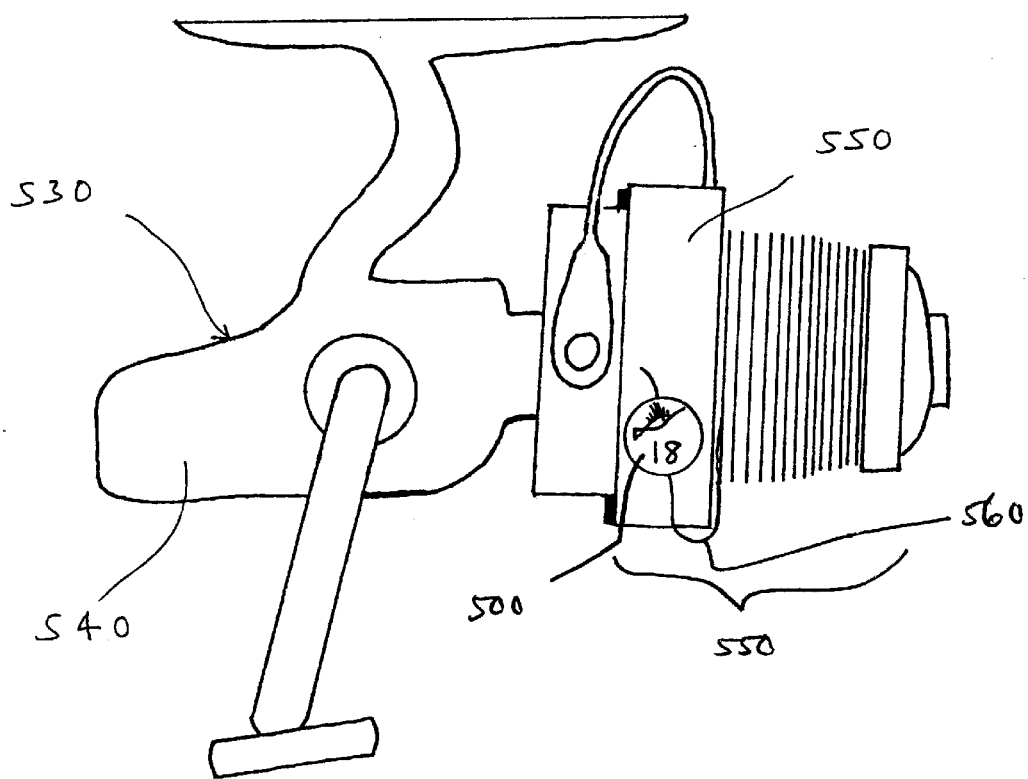
FIG. 16 illustrates a spinning reel having a device according to the present invention attached to the reel spool.

FIG. 15 shows the use of retention device 500 on a conventional spinning reel 530. Spinning reel 530 is comprised generally of body 540 and spool 550. In this embodiment, retention device 500 is adhered to body 540. Retention device 500 is shown retaining line 560. FIG. 16 shows retention device 500 mounted to spool 550.

Retention device 500 is preferably mounted to the spool as the spools of many reels are removable from the reel body and replaceable with spools holding lines of different physical qualities. Thus, because a particular line will always be with its respective spool, but not necessarily always with a particular reel body, use of retention device 500 on the spool is preferred. Some anglers, however, do not have multiple spools for a particular reel body, and therefore use of the retention device on the body is acceptable.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A fishing line retention device for use on a piece of fishing equipment, said device comprising:
   a hook member having a plurality of hooks on one side; and
   a loop member having a plurality of loops on one side; said loops cooperating with said hooks to removably attach said hook member to said loop member and retain a fishing line between said hook member and said loop member;
   a mounting adhesive disposed on one of said hook member and said loop member, on a side opposite said hooks or said loops, and having sufficient adhesion to allow use of said device on a piece of fishing equipment to retain the fishing line; and
   visual indicia on said hook member or said loop member not having said mounting adhesive, said visual indicia indicating a physical quality of the fishing line to be retained between said hook member and said loop member.

2. The fishing line retention device of claim 1 wherein said visual indicia is on a substrate attached to said hook member or said loop member not having said mounting adhesive, on a side of said member not having side mounting adhesive opposite said hooks or said loops.

3. The fishing line retention device of claim 2 wherein said visual indicia substrate is attached with a visual indicia substrate adhesive to said hook member or said loop member not having said mounting adhesive.

4. A fishing line retention device kit comprising:
   a hook member having a plurality of hooks on one side; and
   a loop member having a plurality of loops on one side; said loops cooperating with said hooks to removably attach said hook member to said loop member and retain a fishing line between said hook member and said loop member;
   a water-resistant mounting adhesive disposed on one of said hook member and said loop member, on a side opposite said hooks or said loops, and having sufficient adhesion to allow use of said device on a piece of fishing equipment to retain a fishing line;
   a peel-away protective backing layer disposed on said water-resistant mounting adhesive; and
   a visual indicia member indicating a physical quality of the fishing line to be retained in said device.

5. The kit of claim 4 wherein said device is adapted to be disposed on a fishing reel.

6. The kit of claim 5 wherein said fishing reel is a fly reel.

7. A fishing reel comprising:
   a body;
   a spool attached to aid body for holding fishing line;
   a hook member having a first side attached to one of said body and said spool, and a second side having a plurality of hooks; and
   a loop member having a plurality of loops, said loops cooperating with said hooks to removably attach said loop member to said hook member and retain the fishing line between said hook member and said loop member;
   wherein said loop member has visual indicia on a side opposite said loops indicating a physical quality of the fishing line to be retained on said spool.

8. A fishing reel comprising:
   a body;
   a spool attached to said body for holding fishing line;
   a loop member having a first side attached to one of said body and said spool, and a second side having a plurality of loops; and
   a hook member having a plurality of hooks, said hooks cooperating with said loops to removably attached said hook member to said loop member and retain the fishing line between said hook member and said loop member;
   wherein said hook member has visual indicia on a side opposite said hooks, said visual indicia indicating a physical equality of the fishing line to be retained on said spool.

* * * * *